(12) United States Patent
Shahi et al.

(10) Patent No.: US 7,567,049 B2
(45) Date of Patent: Jul. 28, 2009

(54) FLUID FLOW CONTROL FOR FLUID HANDLING SYSTEMS

(75) Inventors: Prakash B. Shahi, St. Louis, MO (US); Arthur E. Woodward, Manchester, MO (US); Christopher D. Schock, St. Peters, MO (US)

(73) Assignee: Emerson Electric Co., St. Louis, MO (US)

( * ) Notice: Subject to any disclaimer, the term of this patent is extended or adjusted under 35 U.S.C. 154(b) by 161 days.

(21) Appl. No.: 11/408,755

(22) Filed: Apr. 21, 2006

(65) Prior Publication Data

US 2007/0248467 A1    Oct. 25, 2007

(51) Int. Cl.
    *H02P 7/00* (2006.01)
(52) U.S. Cl. .................. 318/432; 318/430; 318/400.07; 318/400.08
(58) Field of Classification Search ............... 318/432, 318/727, 430, 701, 400.07, 400.08, 644
    See application file for complete search history.

(56) References Cited

U.S. PATENT DOCUMENTS

| | | | |
|---|---|---|---|
| 4,638,233 A * | 1/1987 | Erdman ...................... 318/644 |
| 4,806,833 A * | 2/1989 | Young ................... 318/400.08 |
| 4,978,896 A | 12/1990 | Shah |
| 5,019,757 A * | 5/1991 | Beifus ................... 318/400.07 |
| 5,447,414 A * | 9/1995 | Nordby et al. ................. 417/20 |
| 5,692,385 A * | 12/1997 | Hollenbeck et al. ........... 62/154 |
| 5,736,823 A * | 4/1998 | Nordby et al. .............. 318/432 |
| 5,818,194 A * | 10/1998 | Nordby ...................... 318/701 |
| 7,208,895 B2 * | 4/2007 | Marcinkiewicz et al. ...................... 318/400.15 |
| 7,246,997 B2 * | 7/2007 | Liu et al. ...................... 415/204 |
| 2003/0011342 A1 * | 1/2003 | Eichorn ...................... 318/727 |
| 2003/0042860 A1 * | 3/2003 | Sulfstede .................... 318/432 |
| 2005/0280384 A1 * | 12/2005 | Sulfstede .................... 318/432 |
| 2006/0265890 A1 * | 11/2006 | Solan et al. .................... 33/320 |
| 2006/0290302 A1 * | 12/2006 | Marcinkiewicz et al. ....... 318/66 |
| 2006/0290304 A1 * | 12/2006 | Marcinkiewicz et al. .... 318/432 |
| 2007/0170880 A1 * | 7/2007 | Shahi et al. .................. 318/432 |

* cited by examiner

*Primary Examiner*—Paul Ip
(74) *Attorney, Agent, or Firm*—Harness, Dickey & Pierce, P.L.C.

(57) ABSTRACT

A controller for an electric motor in a blower system includes an input for receiving an air flow demand. The controller is configured for producing drive signals for the electric motor from the air flow demand using an equation having a plurality of terms. At least one of the terms includes a composite function $S*CFM^n$, where S is a speed of the electric motor, CFM is the air flow demand, and $n>1$. These teachings can also be applied to other types of fluid handling systems including, for example, liquid pumps.

24 Claims, 6 Drawing Sheets

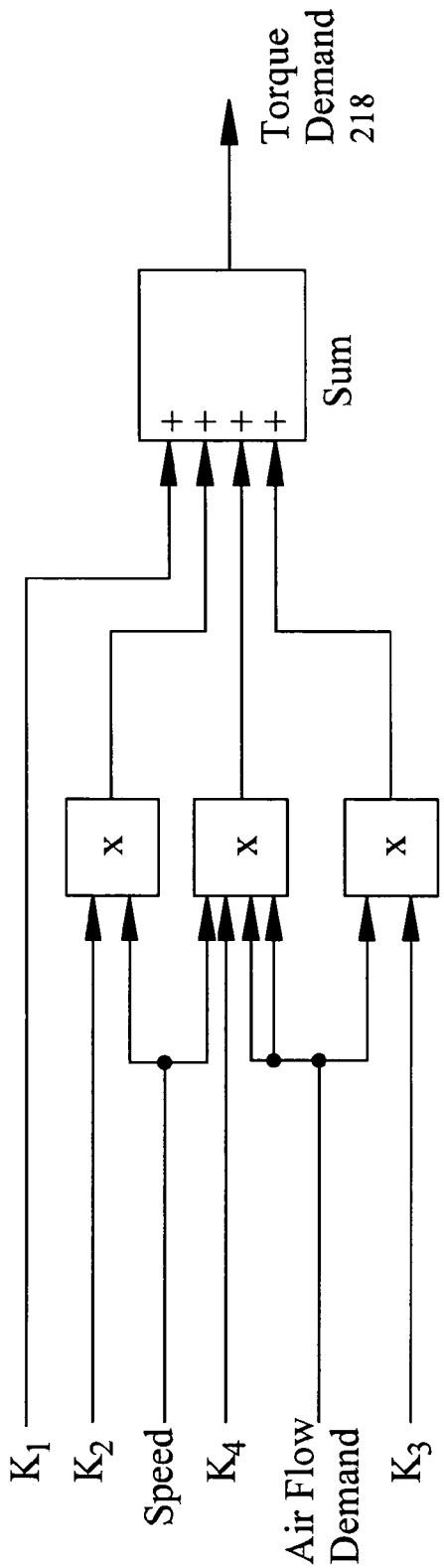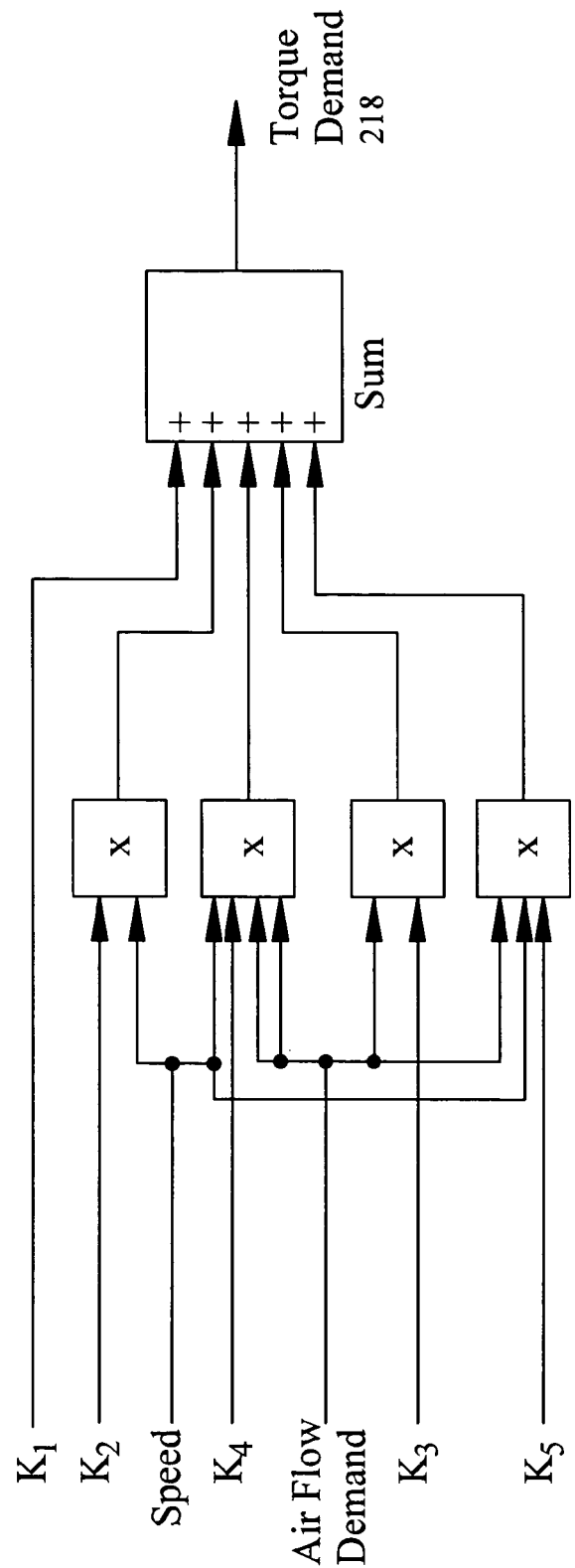

FLUID FLOW CONTROL FOR FLUID HANDLING SYSTEMS

FIELD

The present disclosure relates generally to electric motor and controller assemblies for blower systems (also referred to as air handler systems) and other fluid handling systems.

BACKGROUND

The statements in this section merely provide background information related to the present disclosure and may not constitute prior art.

Heating, ventilation and/or air conditioning ("HVAC") systems commonly employ blower systems for moving air. These blower systems typically include a fan (such as a squirrel cage fan), an electric motor for driving rotation of the fan, and a controller for the electric motor. In some systems, the controller receives an air flow demand from a system controller, such as a thermostat, and converts the air flow demand into a motor torque demand. The controller then produces drive signals for the motor that are intended to produce the demanded torque so as to produce the demanded air flow. Thus, to accurately produce the demanded air flow in such systems, the controller must accurately convert the air flow demand into a corresponding torque demand.

A variety of schemes are known for converting air flow demands into torque demands. For example, U.S. Pat. No. 4,978,896 provides a multiple slope algorithm for maintaining desired airflow rate over a range of static pressures. In particular, different torque demand equations with different slopes are used depending upon the speed of the motor. At low speeds, torque is directly proportional to the square of the desired airflow rate. At speeds above the maximum operating speed, torque is reduced using a different equation, etc.

U.S. Pat. No. 5,447,414 presents another method for producing a torque demand from an airflow demand in accordance with the formula: Torque=K1*S*CFM+K2*S+K3*CFM+K4, where S is the speed of the motor, CFM is the demanded airflow, and K1, K2, K3 and K4 are coefficients relating to a particular blower system.

Most known methods require data to be collected in some form to establish a relation between torque, speed and airflow. The collected torque, speed and airflow data is then fitted, either linearly or using multiple slope methods as in U.S. Pat. No. 4,978,896, or by using a torque equation as in U.S. Pat. No. 5,447,414, to find the coefficients K1, K2, K3 and K4.

Although these known schemes are suitable for certain applications, improvements are needed to minimize prediction errors when converting an air flow demand (or another fluid flow demand) into a torque demand.

SUMMARY

The present inventors have succeeded in reducing prediction errors when converting a fluid flow demand, such as an air flow demand, into a torque demand by introducing a term in the torque equation that includes the composite function $S*(FFD)^n$, where S is a speed of the electric motor, FFD is the fluid flow demand, and n>1.

According to one aspect of this disclosure, a controller for an electric motor in a blower system includes an input for receiving an air flow demand. The controller is configured for producing drive signals for the electric motor from the air flow demand using an equation having a plurality of terms. At least one of the terms includes a composite function $S*CFM^n$, where S is a speed of the electric motor, CFM is the air flow demand, and n>1.

According to another aspect of this disclosure, a method of controlling an electric motor in a blower system includes receiving an air flow demand, and producing drive signals for the electric motor from the air flow demand using an equation having a plurality of terms. At least one of the terms includes a composite function $S*CFM^n$, where S is a speed of the electric motor, CFM is the air flow demand, and n>1.

According to yet another aspect of this disclosure, a motor assembly for a blower system includes an electric motor and a controller. The controller has an input for receiving an air flow demand. The controller is configured for converting the air flow demand into a torque demand for the electric motor using an equation having a plurality of terms, at least one of the terms including a composite function $S*CFM^n$, and for producing drive signals for the electric motor corresponding to the torque demand, where S is a speed of the electric motor, CFM is the air flow demand, and n>1.

According to still another aspect of this disclosure, a controller for an electric motor in fluid handling system includes an input for receiving a fluid flow demand. The controller is configured for producing drive signals for the electric motor from the fluid flow demand using an equation having a plurality of terms. At least one of the terms includes a composite function $S*(FFD)^n$, where S is a speed of the electric motor, FFD is the fluid flow demand, and n>1.

Further areas of applicability will become apparent from the description provided herein. It should be understood that the description and specific examples are provided for purposes of illustration only and are not intended to limit the scope of the present disclosure.

DRAWINGS

The drawings described herein are for illustration purposes only and are not intended to limit the scope of the present disclosure in any way.

FIG. 3 is a block diagram of the air flow control module of FIG. 2 according to another embodiment.

FIG. 4 is a block diagram illustrating another alternative embodiment of the air flow control module of FIG. 2.

DETAILED DESCRIPTION

The following description is merely exemplary in nature and is not intended to limit the present disclosure, its applications, or uses.

Figure 1:
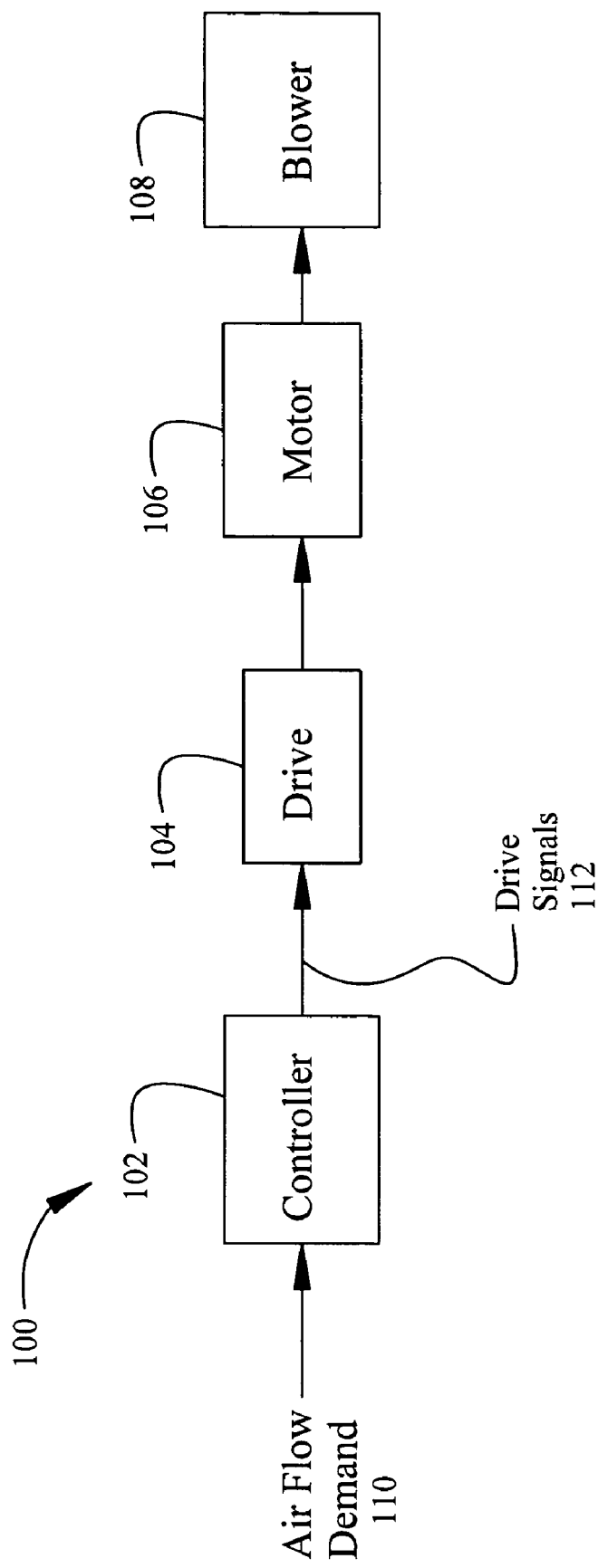
FIG. 1 is a block diagram of a blower system according to one embodiment of the present disclosure.

A blower system according to one embodiment of this disclosure is illustrated in FIG. 1 and indicated generally by reference number 100. As shown in FIG. 1, the blower system 100 includes a controller 102, a drive 104, an electric motor 106 and a blower 108. The controller 102 includes an input for receiving an air flow demand 110, typically from a system controller (not shown) such as a thermostat or multi-system controller. The controller 102 is configured for producing drive signals 112 for the motor 106 from the air flow demand 110 using an equation having multiple terms. At least one of these terms includes a composite function $S*CFM^n$, where S is a speed of the electric motor, CFM is the air flow demand, and n>1. By using such an equation for converting the air flow demand 110 into the drive signals 112 for the motor, the controller 102 can more accurately account for non-linearities between the air flow demand and other parameters of the system 100.

As further illustrated in FIG. 1, the controller 102 provides the drive signals 112 to the drive 104. The drive 104 energizes the electric motor 106 in accordance with the drive signals 112 received from the controller 102. When energized, the motor 106 drives rotation of the blower 108 for moving air. In some embodiments, the blower 108 is a squirrel cage fan.

Although not shown in FIG. 1, the controller 102 preferably receives feedback from the motor 106 indicative of the motor speed, output torque and/or position (e.g., rotor position) using sensors or sensorless techniques.

While the controller 102, the drive 104 and the motor 106 are illustrated as physically separate components in FIG. 1, it should be understood that some or all of these components can be integrated in a single package without departing from the teachings of this disclosure. As apparent to those skilled in the art, the blower system of FIG. 1 is well suited for HVAC and other applications.

Figure 2:
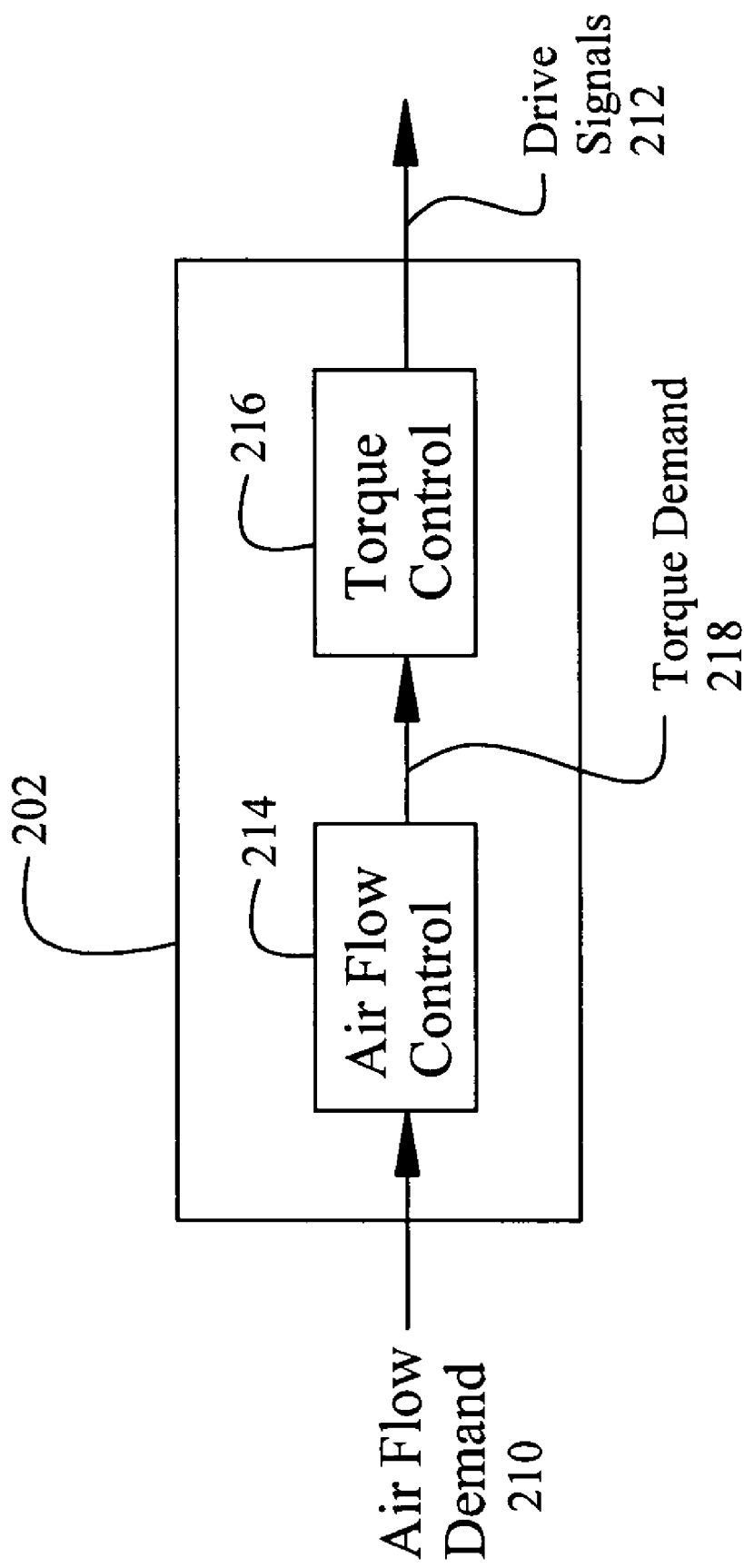
FIG. 2 is a block diagram of the controller of FIG. 1 according to one particular embodiment.

FIG. 2 illustrates one specific embodiment of the controller 102 shown in FIG. 1. In the embodiment of FIG. 2, the controller 202 includes an air flow control module 214 and a torque control module 216. As shown in FIG. 2, the air flow control module 214 converts a received air flow demand 210 (e.g., a demanded CFM) into a torque demand 218. The torque control module 216 converts the torque demand 218 into drive signals 212 for producing the demanded motor torque. The air flow control module 214 is configured for producing the torque demand 218 using an equation having multiple terms. At least one of these terms includes a composite function $S*CFM^n$, where S is a speed of the electric motor, CFM is the air flow demand, and n>1.

FIG. 3 illustrates one embodiment of the air flow control module 214 of FIG. 2. As shown in FIG. 3, the air flow control module 214 calculates the torque demand as:

$Torque=K1+K2*S+K3*CFM+K4*S*CFM^2$, where S represents motor speed and CFM represents the air flow demand 210 received by the air flow control module 214. K1-K4 are constants derived for a particular blower system (e.g., using test data and a least square regression analysis). In this particular embodiment, the last term of the equation includes the composite function $S*CFM^n$, where n=2. It should be understood, however, that the CFM variable in this composite function can be raised to any power n, where n>1, without departing from the teachings of this disclosure.

FIG. 4 illustrates an alternative embodiment of the air flow control module 214 of FIG. 2. In the embodiment of FIG. 4, the air flow control module calculates the torque demand as:

$Torque=K1+K2*S+K3*CFM+K4*S*CFM^2+K5*S*CFM$, where K1, K2, K3, K4 and K5 are constants derived for a particular blower system. Thus, in the embodiment of FIG. 4, the equation used by the air flow control module has five terms (including four first order terms and one higher order term). In contrast, the equation employed in the embodiment of FIG. 4 has only four terms (including three first order terms and one higher order term). It should be understood, however, that equations having more or less terms, including equations having more than one higher order term, can be employed in other embodiments without departing from the teachings of this disclosure.

The constants K1-K4 (or K1-K5) can be derived for a wide range of blower systems and provided to the controller 102 of FIG. 1 (e.g., via a serial or other communication input, via stored tables accessible to the controller 102 (including one or more digital signal processors embodied in the controller 102, if applicable), etc.). The constants can be derived by performing a multiple regression from torque, speed and demanded air flow data collected for each blower system. Multiple regression solves for the unknown coefficients K1, K2, K3, and K4 by performing a least squares fit. The following table illustrates the speed (in RPM), actual airflow (in cubic feet per minute, or CFM) and Torque (in Nm/2048) collected for one particular blower system at various static pressures.

| static pressure (in inches of water) | torque (T) in (Nm/2048) | speed (S) in RPM | Airflow (CFM) in cubic feet per minute | speed*airflow*airflow (S*CFM*CFM)/(256*256*8) |
|---|---|---|---|---|
| 0.1 | 11250 | 1169.40 | 2019.06 | 9092.68 |
| 0.3 | 11250 | 1218.92 | 1972.29 | 9043.71 |
| 0.5 | 11250 | 1270.57 | 1930.40 | 9030.72 |
| 0.7 | 11250 | 1320.22 | 1885.87 | 8955.69 |
| 0.9 | 11250 | 1374.16 | 1839.06 | 8864.58 |
| 0.1 | 7500 | 987.23 | 1666.60 | 5230.13 |
| 0.3 | 7500 | 1050.34 | 1613.11 | 5212.98 |
| 0.5 | 7500 | 1113.24 | 1562.51 | 5184.04 |
| 0.7 | 7500 | 1173.90 | 1505.06 | 5071.88 |
| 0.9 | 7500 | 1231.99 | 1451.84 | 4953.08 |
| 0.1 | 3750 | 730.31 | 1131.87 | 1784.58 |
| 0.3 | 3750 | 813.32 | 1061.31 | 1747.31 |
| 0.5 | 3750 | 905.28 | 978.13 | 1651.99 |
| 0.7 | 3750 | 1004.97 | 876.66 | 1473.16 |
| 0.9 | 3750 | 1069.25 | 814.27 | 1352.21 |
| 0.1 | 2250 | 583.25 | 806.59 | 723.75 |
| 0.3 | 2250 | 708.92 | 704.51 | 671.13 |
| 0.5 | 2250 | 809.01 | 596.30 | 548.67 |
| 0.7 | 2250 | 915.96 | 501.73 | 439.79 |
| 0.9 | 2250 | 1014.02 | 401.94 | 312.46 |

To solve for constants K1-K4, first a regression matrix X is made from T, S, CFM and S*CFM² as follows:

$$X = \begin{pmatrix} 1 & 1169.4016 & 2019.0592 & 9092.6794 \\ 1 & 1218.9202 & 1972.2891 & 9043.7069 \\ 1 & 1270.5685 & 1930.3992 & 9030.7206 \\ 1 & 1320.2162 & 1885.8711 & 8955.6919 \\ 1 & 1374.1637 & 1839.0552 & 8864.5781 \\ 1 & 987.2346 & 1666.5979 & 5230.1253 \\ 1 & 1050.3373 & 1613.1082 & 5212.9773 \\ 1 & 1113.2449 & 1562.5133 & 5184.0387 \\ 1 & 1173.9026 & 1505.0590 & 5071.8823 \\ 1 & 1231.9899 & 1451.8413 & 4953.0820 \\ 1 & 730.3137 & 1131.8741 & 1784.5792 \\ 1 & 813.3173 & 1061.3057 & 1747.3144 \\ 1 & 905.2825 & 978.1290 & 1651.9864 \\ 1 & 1004.9734 & 876.6625 & 1473.1587 \\ 1 & 1069.2526 & 814.2684 & 1352.2145 \\ 1 & 583.2505 & 806.5903 & 723.7543 \\ 1 & 708.9227 & 704.5141 & 671.1326 \\ 1 & 809.0061 & 596.3005 & 548.6713 \\ 1 & 915.9609 & 501.7262 & 439.7852 \\ 1 & 1014.0225 & 401.9360 & 312.4579 \end{pmatrix}$$

Then, the coefficient matrix, $$\begin{pmatrix} K1 \\ K2 \\ K3 \\ K4 \end{pmatrix},$$

can be solved $$\begin{pmatrix} K1 \\ K2 \\ K3 \\ K4 \end{pmatrix} = X \setminus T,$$

where \ denotes left matrix division. As apparent to those skilled in matrix solving, the solution to this can be achieved using Gaussian Elimination technique. The coefficients calculated for the above example using Gaussian Elimination are as follows: K1=−341.8516; K2=1.8455; K3=1.1298; K4=0.7854.

Figure 5:
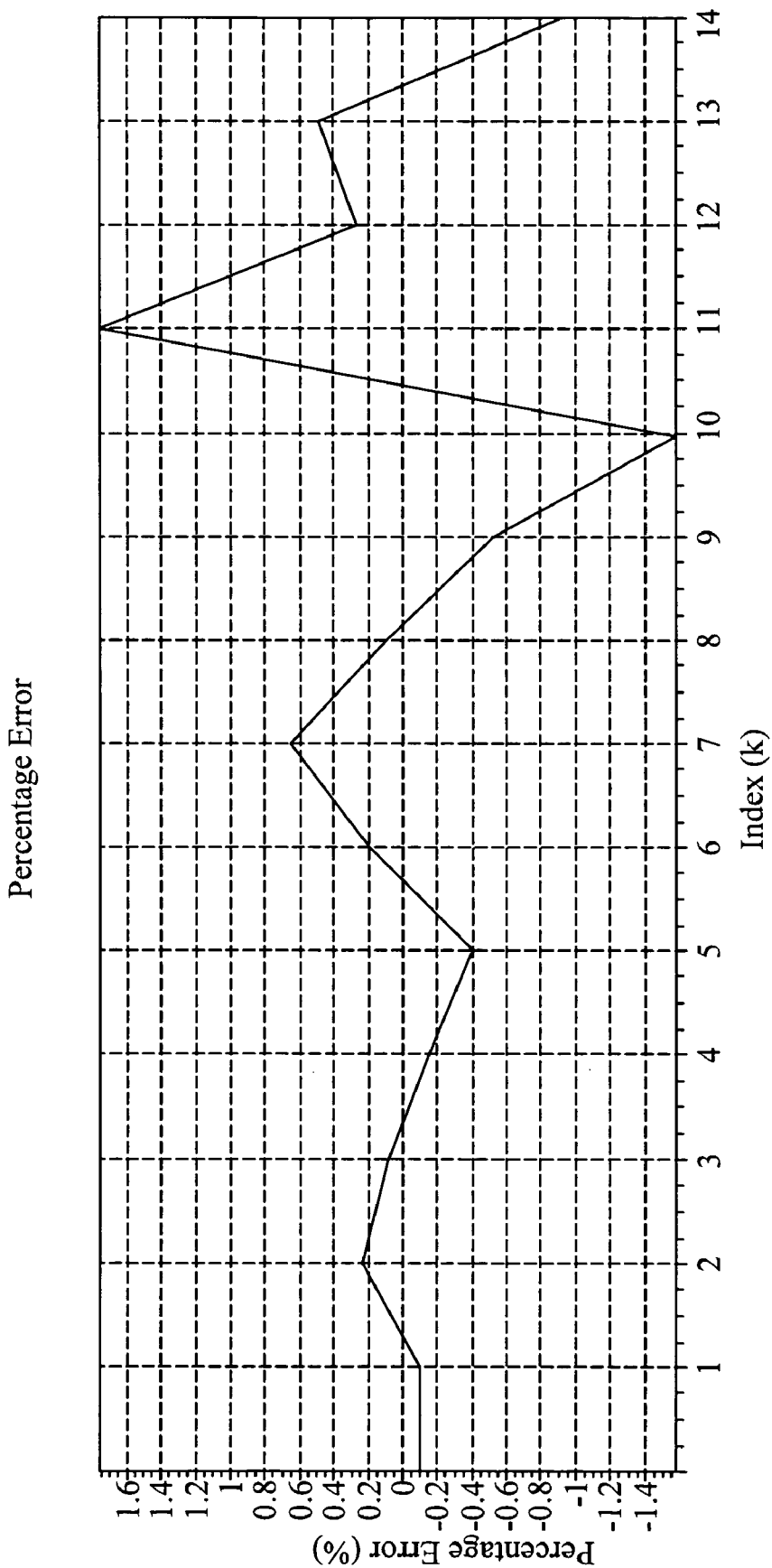
FIG. 5 is a graph depicting errors between actual and demanded torques in one exemplary embodiment of this disclosure.

To validate the model, one can calculate the errors (including prediction errors) by subtracting the calculated torque demand from the actual torque demand at a particular airflow rate. The errors for the particular blower system in the above example are plotted in FIG. 5. As shown in FIG. 5, the maximum error for the given data is less than 1.7%. Significantly, if the composite function S*CFM$^n$ were not employed in the equation for converting the air flow demand into drive signals for the electric motor, the errors would be greater.

As apparent to those skilled in the art, the control modules illustrated generally in FIG. 2 can be implemented in hardware or software in a variety of manners. For example, in some embodiments, the control modules are implemented using digital signal processors.

Although various blower system embodiments have been described above, it should be understood that the teachings of this disclosure can also be applied to other types of fluid handling systems including, for example, air and liquid pumps.

Figure 6:
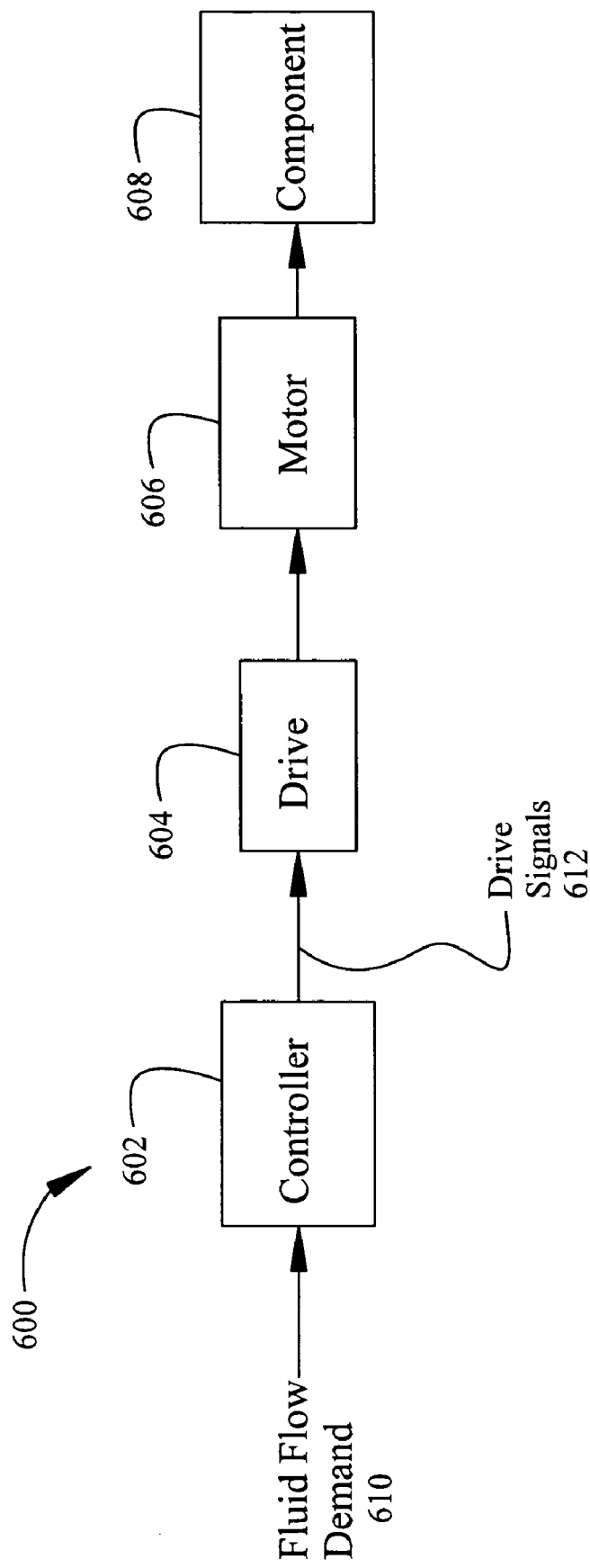
FIG. 6 is a block diagram of a fluid handling system according to another embodiment of the present invention.

A fluid handling system 600 according to another embodiment of this disclosure is illustrated in FIG. 6. As shown therein, the system 600 includes a controller 602, a drive 604, an electric motor 606 and a component 608 driven by the electric motor 606. The controller 602 includes an input for receiving a fluid flow demand 610 (e.g., the desired mass flow rate of a fluid). The controller 602 is configured for producing drive signals 612 for the motor 606 from the fluid flow demand 610 using an equation having multiple terms. At least one of these terms includes a composite function $S*(FFD)^n$, where S is a speed of the electric motor, FFD is the fluid flow demand, and n>1. By using such an equation for converting the fluid flow demand 610 into the drive signals 612 for the motor, the controller 602 can more accurately account for non-linearities between the fluid flow demand and other parameters of the system 600. The component 608 can be, for example, a pump (or blower), and the fluid flow demand 610 can be a desired flow rate of a liquid or gas in the system 600.

Figure 7:
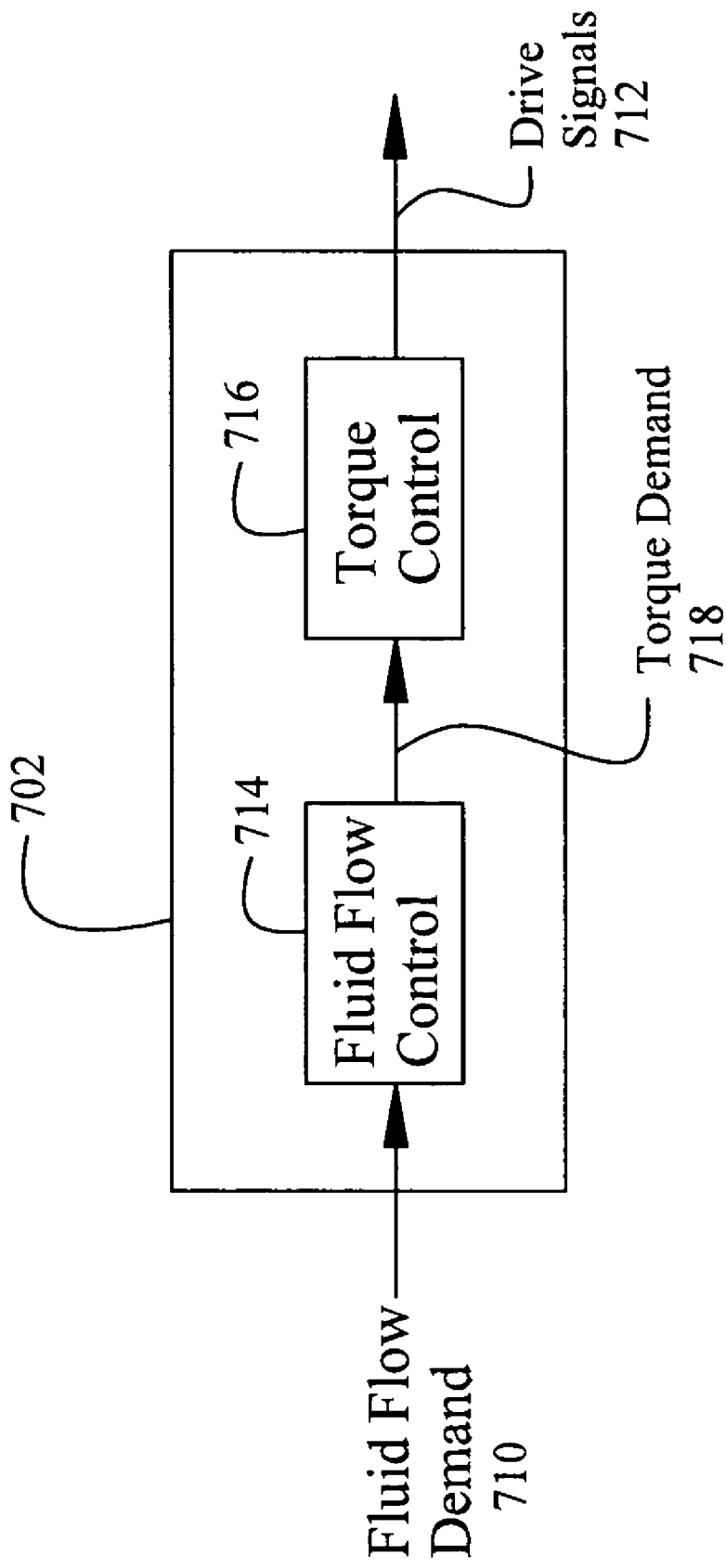
FIG. 7 is a block diagram of the controller of FIG. 6 according to one particular embodiment.

FIG. 7 illustrates one specific embodiment of the controller 602 shown in FIG. 6. In the embodiment of FIG. 7, the controller 702 includes a fluid flow control module 714 and a torque control module 716. As shown in FIG. 7, the fluid flow control module 714 converts a received fluid flow demand 710 (e.g., a demanded flow rate for a liquid) into a torque demand 718. The torque control module 716 converts the torque demand 718 into drive signals 712 for producing the demanded motor torque. The fluid flow control module 714 is configured for producing the torque demand 718 using an equation having multiple terms. At least one of these terms includes a composite function $S*(FFD)^n$, where S is a speed of the electric motor, FFD is the fluid flow demand, and n>1. In some embodiments, the equation includes at least four or five terms, and n≧2.

Exemplary systems and methods for controlling the output torque and/or speed of an electric motor using sensors or sensorless techniques are described in U.S. application Ser. No. 11/293,743 filed Dec. 2, 2005 for Control Systems and Methods for Permanent Magnet Rotating Machines, and U.S. application Ser. No. 11/293,744 filed Dec. 2, 2005 for Sensorless Control Systems and Methods for Permanent Magnet Rotating Machines. The entire disclosures of these applications are incorporated herein by reference.

What is claimed is:

1. A controller for an electric motor in a blower system, the controller including an input for receiving an air flow demand, the controller comprising an air flow control module for converting the air flow demand into a torque demand as a function of a speed of the electric motor multiplied by the air flow demand raised to a power greater than one, the torque demand representing a demanded torque of the electric motor, and a torque control module for converting the torque demand into drive signals for the electric motor to produce the demanded motor torque.

2. The controller of claim 1 wherein said power is greater than or equal to two.

3. The controller of claim 2 wherein the air flow control module is configured for converting the air flow demand into the torque demand using an equation having at least four terms.

4. The controller of claim 3 wherein said equation has at least five terms.

5. The controller of claim 2 wherein the air flow control module is configured for converting the air flow demand into the torque demand using the following equation:

$$\text{Torque} = K1 + K2*S + K3*CFM + K4*S*CFM^2,$$ where $K1, K2, K3$ and $K4$ are constants.

6. The controller of claim 5 wherein said constants are coefficients for said blower system.

7. The controller of claim 2 wherein the air flow control module is configured for converting the air flow demand into the torque demand using the following said equation:

$$\text{Torque} = K1 + K2*S + K3*CFM + K4*S*CFM^2 + K5*S*CFM,$$ where $K1, K2, K3, K4$ and $K5$ are constants.

8. A blower system comprising an electric motor and the controller of claim 1.

9. The blower system of claim 8 further comprising a drive operatively coupled to the controller and the electric motor.

10. The blower system of claim 9 further comprising a blower.

11. A method of controlling an electric motor in a blower system, the method comprising:
receiving an air flow demand; and
producing drive signals for the electric motor from the air flow demand by converting the air flow demand into a torque demand as a function of a speed of the electric motor multiplied by the air flow demand raised to a power greater than one.

12. The method of claim 2 wherein producing includes producing drive signals corresponding to the torque demand.

13. The method of claim 12 wherein said power is greater than or equal to two.

14. The method of claim 13 wherein converting includes converting the air flow demand into the torque demand using an equation having at least four terms.

15. The method of claim 13 wherein converting includes converting the air flow demand into the torque demand using an equation having at least five terms.

16. The method of claim 13 wherein converting includes converting the air flow demand into the torque demand using the following equation:

$$\text{Torque} = K1 + K2*S + K3*CFM + K4*S*CFM^2,$$ where $K1, K2, K3$ and $K4$ are constants.

17. A motor assembly for a blower system, the assembly comprising on electric motor and a controller, the controller having an input for receiving an air flow demand, the controller comprising an air flow control module for converting the air flow demand into a torque demand for the electric motor as a function of a speed of the electric motor multiplied by the air flow demand raised to a power greater than one, and a torque control module for converting the torque demand into drive signals for the electric motor.

18. The assembly of claim 17 wherein said power is greater than or equal to two.

19. The assembly of claim 17 further comprising a drive operatively coupled to the electric motor and the controller for applying power to the electric motor in response to the drive signals produced by the controller.

20. A controller for an electric motor in fluid handling system, the controller including an input for receiving a fluid flow demand, the controller comprising a fluid flow control module for converting the fluid flow demand into a torque demand as a function of a speed of the electric motor multiplied by the fluid flow demand raised to a power greater than one, the torque demand representing a demanded torque of the electric motor, and a torque control module for converting the torque demand into drive signals for the electric motor to produce the demanded motor torque.

21. The controller of claim 20 wherein said power is greater than or equal to two.

22. The controller of claim 21 wherein the fluid flow control module is configured for converting the fluid flow demand into the torque demand using an equation having at least four terms.

23. The controller of claim 21 wherein the fluid flow control module is configured for converting the fluid flow demand into the torque demand using an equation having at least five terms.

24. A fluid handling system comprising an electric motor and the controller of claim 20.

* * * * *

UNITED STATES PATENT AND TRADEMARK OFFICE
CERTIFICATE OF CORRECTION

PATENT NO. : 7,567,049 B2
APPLICATION NO. : 11/408755
DATED : July 28, 2009
INVENTOR(S) : Prakash B. Shahi, Arthur E. Woodward and Christopher D. Schock Page 1 of 1

It is certified that error appears in the above-identified patent and that said Letters Patent is hereby corrected as shown below:

In the Claims:

In Claim 17, line 2, replace "on" with "an".

Signed and Sealed this

Twenty-second Day of September, 2009

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,567,049 B2 |
| APPLICATION NO. | : 11/408755 |
| DATED | : July 28, 2009 |
| INVENTOR(S) | : Prakash B. Shahi, Arthur E. Woodward and Christopher D. Schock |

It is certified that error appears in the above-identified patent and that said Letters Patent is hereby corrected as shown below:

In the Claims:

Column 7, Claim 17, line 7, replace "on" with "an".

This certificate supersedes the Certificate of Correction issued September 22, 2009.

Signed and Sealed this

Twenty-seventh Day of October, 2009

David J. Kappos
*Director of the United States Patent and Trademark Office*

UNITED STATES PATENT AND TRADEMARK OFFICE
CERTIFICATE OF CORRECTION

PATENT NO. : 7,567,049 B2
APPLICATION NO. : 11/408755
DATED : July 28, 2009
INVENTOR(S) : Prakash B. Shahi, Arthur E. Woodward and Christopher D. Schock It is certified that error appears in the above-identified patent and that said Letters Patent is hereby corrected as shown below:

In the Claims:

Column 8, Claim 17, line 7, replace "on" with "an".

This certificate supersedes the Certificates of Correction issued September 22, 2009 and October 27, 2009.

Signed and Sealed this

Twenty-third Day of March, 2010

David J. Kappos
*Director of the United States Patent and Trademark Office*